No. 807,312. PATENTED DEC. 12, 1905.
P. C. PATTERSON.
CONVEYING TROUGH.
APPLICATION FILED JAN. 23, 1904.
2 SHEETS—SHEET 1.
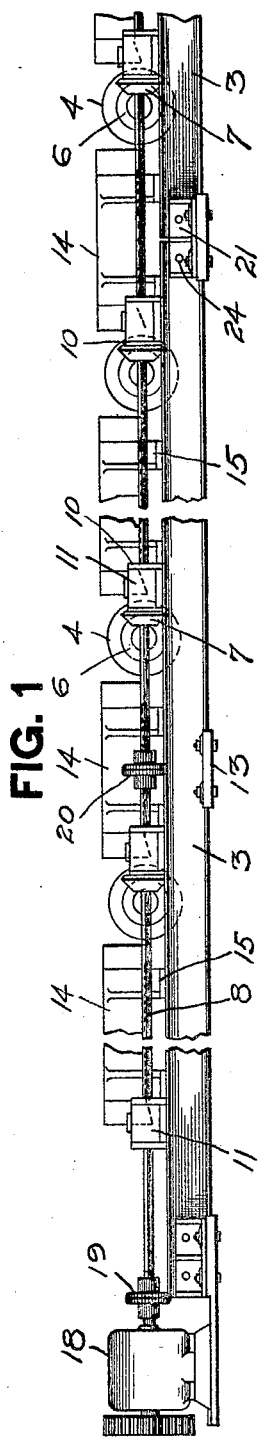
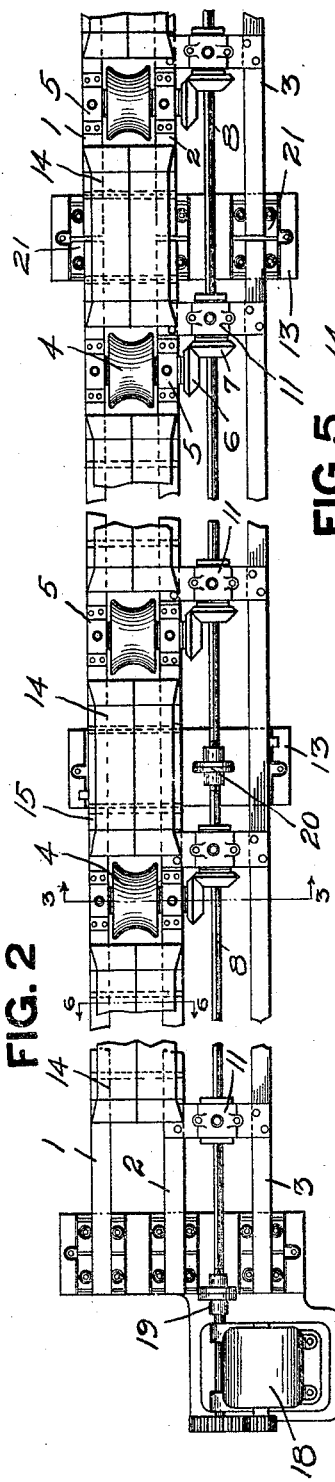
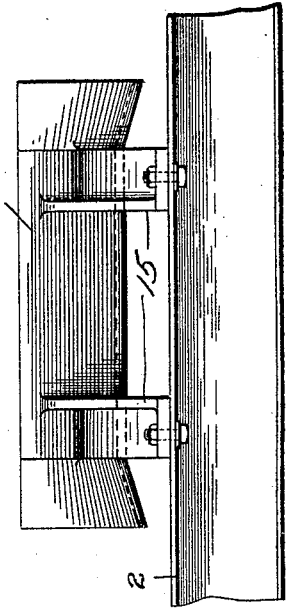
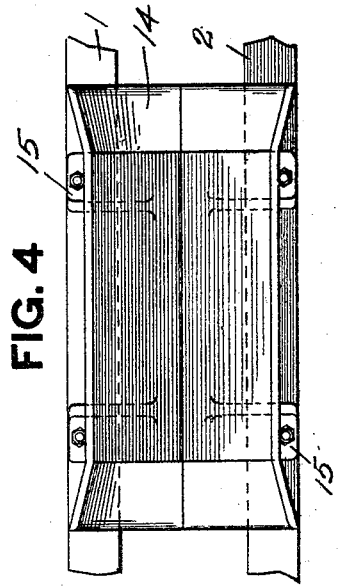
WITNESSES.
J. R. Keller
Robert C. Totten
INVENTOR.
Peter C. Patterson
By Kay Totten & White
attorneys No. 807,312. PATENTED DEC. 12, 1905.
P. C. PATTERSON.
CONVEYING TROUGH.
APPLICATION FILED JAN. 23, 1904.
2 SHEETS—SHEET 2.
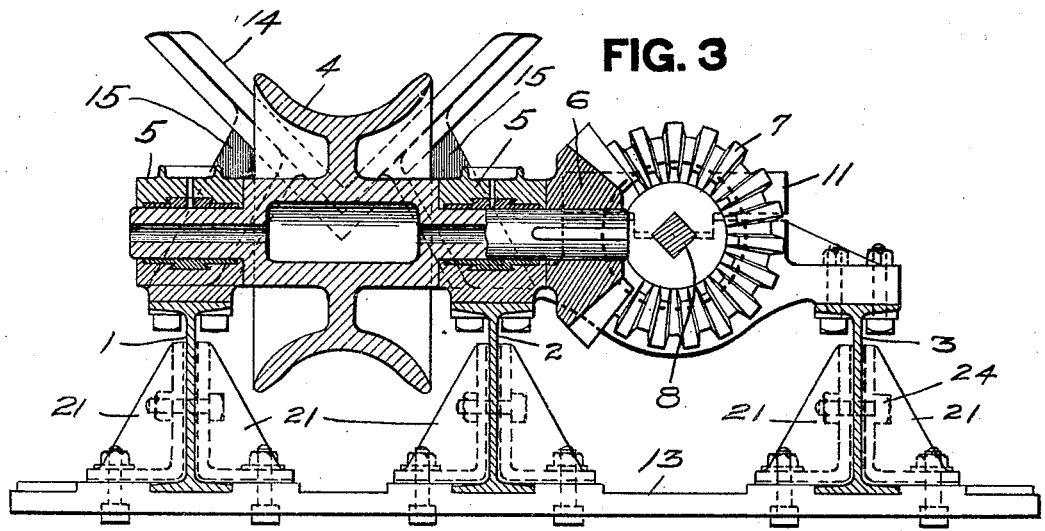
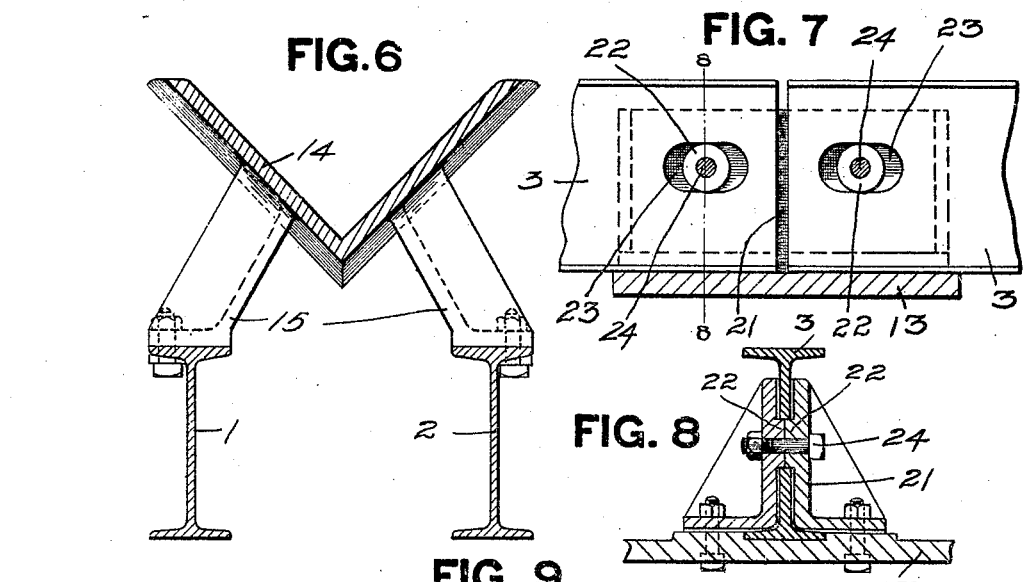
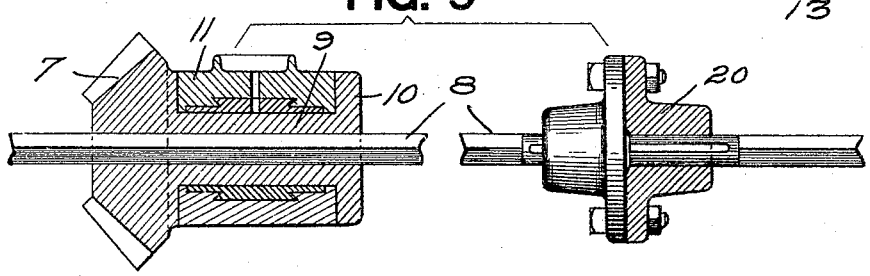
WITNESSES.
INVENTOR.

UNITED STATES PATENT OFFICE.

PETER C. PATTERSON, OF McKEESPORT, PENNSYLVANIA, ASSIGNOR TO NATIONAL TUBE COMPANY, OF PITTSBURG, PENNSYLVANIA, A CORPORATION OF NEW JERSEY.

CONVEYING-TROUGH.

No. 807,312.   Specification of Letters Patent.   Patented Dec. 12, 1905.

Application filed January 23, 1904. Serial No. 190,382.

*To all whom it may concern:*

Be it known that I, PETER C. PATTERSON, a resident of McKeesport, in the county of Allegheny and State of Pennsylvania, have invented a new and useful Improvement in Conveying-Troughs; and I do hereby declare the following to be a full, clear, and exact description thereof.

My invention relates to conveying-troughs for use more especially in tube-mills, although it also may be used for conveying articles in rolling-mills in general.

The object of my invention is to provide a trough of this character provided with power-driven conveying-rollers and so constructed that the bearings and driving-gearing for said rollers will not be detrimentally affected by reason of the heat to which the trough is subjected and in general to so construct the trough that expansion and contraction can take place without affecting the proper mesh of the driving-gearing for the conveying-roller.

In tube-mills conveying-troughs are provided for receiving the tubes from the bending or welding mechanism and conveying the same to other portions of the mill, and with welding-furnaces these troughs are used for conveying the tubes in succession to the sizing and straightening rolls and thence to the cooling-beds. The practice heretofore has been to provide troughs of practically continuous construction, and the power-driven rollers in said troughs had their bearings mounted directly on such continuous members. As a consequence the heat of the tubes is communicated directly to the roller-bearings, often resulting in melting out the Babbitt or other soft-metal bearings. In all such troughs the power-rollers are driven by means of bevel-gearing from a longitudinally-arranged shaft, and inasmuch as the rollers are mounted directly on the trough the expansion and contraction of the latter are liable to either bring the bevel-gears out of mesh or so deep in mesh as to create unnecessary friction. It is also the practice to secure the bevel-gears directly to the longitudinal shaft, and as the latter does not expand to the same extent as the trough itself this adds another element tending to the separation of the bevel-gears when the trough becomes heated. All prior troughs are formed of practically continuous members of cast-iron, which necessarily has to be made heavy to give the necessary strength, and, furthermore, they are inflexible, so that any severe strain is liable to fracture the same.

The object of my invention is to overcome all of the above defects in conveying-troughs for tube and similar mills; and to this end it consists, generally stated, in forming the trough of a supporting-frame, mounting on said frame power-driven conveyer-rollers, and providing trough-sections intermediate the rolls, which trough-sections are interrupted and so united with the frame as not to be in contact with the roller-bearings, thus preventing unnecessary heating of said bearings.

The invention also consists in providing the bevel-gears on the longitudinal shaft with sleeve-journals, which are mounted in the bearings, and providing a sliding fit of the longitudinal shaft in said sleeves, the opening in the sleeves and longitudinal shaft being either polygonal or otherwise so shaped that the gears rotate with the shaft. The sliding arrangement permits free expansion of the frame without affecting the mesh of the bevel-gears.

The invention also consists in providing a sliding coupling connection between the longitudinal shaft and its driving-motor and in so uniting the meeting ends of adjacent sections of the trough-frame that free expansion and contraction are permitted.

In the accompanying drawings, Figure 1 is a side view of my improved trough. Fig. 2 is a plan view of the same. Fig. 3 is a cross-section thereof on the line 3 3, Fig. 2. Figs. 4 and 5 are respectively plan and side views of a portion on an enlarged scale. Fig. 6 is a cross-section on the line 6 6, Fig. 2. Fig. 7 is a side view, partly in section, of the connecting means for the trough-sections. Fig. 8 is a cross-section on the line 8 8, Fig. 7; and Fig. 9 shows details of the driving means.

My improved table is built up of structural shapes, the frame being formed of three parallel beams 1, 2, and 3, which may be either I-beams, such as shown, or channel-beams. The power-driven grooved rollers 4 are mounted in bearings 5, secured to one of the side beams 1 and the middle beam 2. These rollers are provided with the usual bevel-pinion 6, meshing with a similar pinion 7, driven from a longitudinal shaft 8. Heretofore the practice has been to secure the pinions 7 fixedly to the shaft 8; but according to my invention the pinions 7 are provided with journal-sleeves 9, having on their outer ends collars 10, these sleeves being mounted in bearings 11, secured to the middle beam 2 and the outer beam 3. The shaft 8 has a sliding fit in these journal-sleeves. The outer beam 3 and middle beam 2 are united transversely by the bearings 11, while the middle beam 2 and outer beam 1 are united transversely either by plates or other suitable cross-connecting members 13 or by the trough-sections 14, the latter being used at such places along the trough or at such intervals as to hold the tube or other article to be conveyed on the power-driven rollers 4. These trough-sections are used especially at the points where the tubes or other articles are introduced into the conveying-trough and where they are lifted out of the trough and also at suitable intervals where there is danger of the tube unduly sagging down between adjacent rollers. At all other places for simplicity of construction a simple cross-connector, such as a plate 13, will be used.

The trough-sections 14 are V-shaped in cross-section, as indicated in Fig. 3, and provided with four or other number of legs 15, which are bolted to the beams 1 and 2. These trough-sections extend only between adjacent rollers 4 and have no contact whatsoever with the bearings 5 of the rollers. As a consequence the heat of the tube or other article will not be conducted to the boxes 5 with such intensity as to melt the Babbitt metal therein, thus overcoming one serious source of trouble with prior constructions of conveying-troughs for hot material. The beams composing the table will of course be affected by the heat to some extent and will therefore expand and contract; but inasmuch as the bearings for the pinions 6 and 7 are carried by these beams any expansion or contraction in said beams will not affect the mesh of these pinions, and this entirely independent of any lack of expansion of the longitudinal shaft 8, since the latter is free to slide through the journal-sleeves of the pinions 7.

Preferably the shaft 8 will be square and will pass through square openings in the journal-sleeves of the pinions 7; but it may be of any other polygonal form or, if desired, may have a splined connection with said pinions.

The shaft 8 may be driven from any suitable source of power, and in the drawings there is shown for this purpose an electrical motor 18, mounted on one end of the trough. This motor is connected to the shaft 8 by means of a coupling member 19, having a splined connection with the end of the shaft 8 and formed as a deep socket into which the end of the shaft projects and which will permit some contraction and expansion in the shaft 8 without becoming disengaged from said shaft. Similar splined coupling members 20 will be provided on the meeting ends of adjacent sections of the shaft 8.

In order to permit contraction and expansion of the various sections of the table, the meeting ends of adjacent beams are connected so as to permit longitudinal movement thereof. Various forms of connection for this purpose may be used, that shown in the drawings comprising clamping-plates 21, one placed on either side of a beam. Either one or both of these clamping-plates are provided with bosses 22, which project through oblong slots 23 in the beams, the bosses being of such length as to contact with the opposite plate and prevent said plates coming into firm frictional contact with the sides of the beam, so that said beams are held in place by the plates, but in such manner that they may move longitudinally. The securing means comprises bolts 24, passing through the plates 21 and bosses 22. In erecting the frame some little space—say an inch—will be left between the meeting ends of adjacent beams, thus permitting expansion of the same to this extent.

The construction of my conveying-trough is such as to permit the ready expansion and contraction of all portions thereof, but without affecting the driving means for the conveying-rollers. Furthermore, the bearings for said rollers being mounted on supports which are separate from the trough proper are protected to such an extent that the Babbitt metal therein will not be injured by heat. The frame is constructed of rolled metal, and hence can be made lighter than prior constructions, and it is also flexible, and hence less liable to fracture.

It is obvious that the trough is adapted to convey hot articles other than tubes.

The trough as a whole has many practical advantages over old constructions.

What I claim is—

1. In conveyers for tube and like mills, the combination with a series of rollers, a longitudinal driving-shaft, intermeshing bevel-gears on said rollers and shaft, the gears on the shaft being provided with journal-sleeves slidable on and rotatable with said shaft, and means for rotating said shaft.

2. In conveyers for tube and like mills, the combination of a frame, a series of rollers mounted therein, a longitudinal driving-shaft, coöperating bevel-gears on said rollers and longitudinal shaft, the gears on said shaft being provided with journal-sleeves having collars and being provided with polygonal openings therethrough, said longitudinal shaft being polygonal in cross-section and slidable in said journal-sleeves, bearings in which said journal-sleeves are mounted, and means for rotating said longitudinal shaft.

3. In conveyers for tube and like mills, a frame comprising sections having longitudinal members meeting at their ends, uniting means therefor arranged to permit endwise movement of said members, rollers mounted on said frame, a longitudinal power-driven shaft, and coöperating gearing between said rollers and shaft.

4. In conveyers for tube and like mills, the combination of a frame comprising sections having longitudinal members meeting at their ends, said members being provided with oblong slots in their ends, connecting-plates provided with bosses extending into said slots, bolts extending through said connecting-plates and bosses, rollers mounted in said frame, and a longitudinal driving-shaft geared to said rollers.

5. In conveyers for tube and like mills, the combination with a frame, rollers mounted therein, a longitudinal shaft geared to said rollers, power means for driving said shaft, and a coupling member between said power means and shaft so arranged as to permit longitudinal movement of the shaft.

6. In conveyers for tube and like mills, the combination of a frame comprising longitudinal members placed end to end, connections between said members arranged to permit longitudinal movement thereof, rollers mounted in said frame, a sectional longitudinal shaft, connecting-gearing between said shaft and rollers, a coupling member for uniting the ends of adjacent shaft-sections and so arranged as to permit longitudinal movement thereof, and means for rotating said shaft.

7. A conveying-trough for tube and like mills, comprising three beams, trough members connecting the middle beam and one side beam, grooved rollers, bearings therefor mounted on said beams, a longitudinal shaft geared to said rollers, and bearing members for said shaft connecting the middle beam and the other side beam.

In testimony whereof I, the said PETER C. PATTERSON, have hereunto set my hand.

PETER C. PATTERSON.

Witnesses:
ROBERT C. TOTTEN,
G. KREMER.